United States Patent [19]

Fujii

[11] Patent Number: 4,481,648
[45] Date of Patent: Nov. 6, 1984

[54] METHOD AND SYSTEM FOR PRODUCING A SYNCHRONOUS SIGNAL FROM CYCLIC-REDUNDANCY-CODED DIGITAL DATA BLOCKS

[75] Inventor: Yasuhiko Fujii, Yamato, Japan

[73] Assignee: Victor Company of Japan, Limited, Yokohama, Japan

[21] Appl. No.: 398,141

[22] Filed: Jul. 14, 1982

[30] Foreign Application Priority Data

Jul. 17, 1981 [JP] Japan .................................. 56-111651

[51] Int. Cl.$^3$ ........................... H04L 1/08; H04L 7/08
[52] U.S. Cl. ...................................... 375/119; 371/42; 371/69; 370/105
[58] Field of Search ............... 375/106, 110, 114, 119; 371/37, 39, 42, 46, 69; 370/105, 108

[56] References Cited

U.S. PATENT DOCUMENTS

3,789,359  1/1974  Clark, Jr. et al. ..................... 371/46
4,375,102  2/1983  VanDaal .............................. 371/42

*Primary Examiner*—Benedict V. Safourek
*Attorney, Agent, or Firm*—Pollock, VandeSande & Priddy

[57] ABSTRACT

Each block of data having information data and redundant bits is transmitted without any synchronous signal bit word, while transmitted data is processed to find the boundary between consecutive data blocks so that a synchronous signal will be produced at the receiving end. The system for producing the synchronous signal comprises a cyclic redundancy check (CRC) circuit, a frequency divider for dividing the frequency of shift clock pulses and a reset pulse generating circuit. The reset pulse generating circuit is responsive to the output signal from the frequency divider and the shift clock pulses to produce periodically first and second reset pulses with which the CRC circuit and the frequency divider are initialized. The reset pulse generating circuit is further responsive to an error signal from the CRC circuit so that further first and second reset pulses are produced with which the CRC circuit and the frequency divider are initialized again. Initialization is repeated until the frequency divider is synchronous with the bits of the data blocks, and once synchronizm is established, the output signal from the frequency divider can be regarded as the synchronous signal indicative of the boundary between any two consecutive data blocks.

3 Claims, 8 Drawing Figures

METHOD AND SYSTEM FOR PRODUCING A SYNCHRONOUS SIGNAL FROM CYCLIC-REDUNDANCY-CODED DIGITAL DATA BLOCKS

BACKGROUND OF THE INVENTION

This invention relates generally to digital data transmission, and more particularly, the present invention relates to a method and system for producing a synchronous signal from a train of digital data blocks transmitted with no synchronous signal.

Among various methods of detecting errors in digital data transmission, a method of cyclic redundancy check (CRC) is considered to be effective. For instance, when a PCM signal obtained by converting an analog signal, such as an audio signal into a PCM digital signal, is transmitted to be recorded, reproduced or the like, redundant bits are usually added to the data bits so that CRC can be performed to detect errors. In such a method of data transmission, a synchronous bit word is interposed between two consecutive data blocks each including the data carrying necessary information and the above-mentioned redundant bits, so that the synchronous bit word will be detected to distinguish one data block from another in a receiving end. In the conventional method, therefore, the synchronous signal bit word is essential because each data block cannot be distinguished from another without such a synchronous signal bit word. This has been an obstacle in increasing data transmission rate.

SUMMARY OF THE INVENTION

The present invention has been developed in order to remove the above-described drawback inherent to the conventional method of digital data transmission.

It is, therefore, an object of the present invention to provide a new and useful method and system with which data transmission can be effected without transmitting a synchronous signal bit word so that data transmission rate can be effectively increased.

According to a feature of the present invention each block of data having information data and redundant bits is transmitted without any synchronous signal bit word, while transmitted data is processed to find the boundary between consecutive data blocks so that a synchronous signal will be produced at the receiving end.

In accordance with the present invention there is provided a system for producing a synchronous signal from cyclic-redundancy-coded digital data blocks, comprising: a cyclic redundancy check circuit responsive to the digital data blocks and to shift clock pulses for producing an output error signal indicative of the presence of remainder of division of one of the digital data blocks by a predetermined generating polynominal; a frequency divider for producing an output signal by dividing the frequency of the shift clock pulses; and a reset pulse generating circuit responsive to the output signal from the frequency divider and to the shift clock pulses for producing first and second reset pulses which will be respectively fed to the cyclic redundancy check circuit and to the frequency divider as initializing signals, the reset pulse generating circuit being further responsive to the error signal for producing further first and second reset pulses with which the cyclic redundancy check circuit and the frequency divider are initialized again so that initialization is repeatedly effected until the frequency divider is synchronous with the bits of the data blocks where the output signal from the frequency divider can be regarded as the synchronous signal indicative of the boundary between two consecutive data blocks.

In accordance with the present invention there is also provided a method of producing a synchronous signal from cyclic-redundancy-coded digital data blocks, comprising the steps of: producing an error signal indicative of the presence of remainder of division of one of the digital data blocks by a predetermined generating polynominal by effecting cyclic redundancy check in response to shift clock pulses, the error signal being produced by a cyclic redundancey check circuit; producing an output signal by dividing the frequency of the shift clock pulses by means of a frequency divider; producing first and second reset pulses in response to the output signal from the frequency divider and to the shift clock pulses; producing further first and second reset pulses in response to the error signal, the output signal from the frequency divider and to the shift clock pulses; initializing the cyclic redundancy check circuit and the frequency divider by the first and second reset pulses and by the further first and second reset pulses; and repeating the step of initializing until the frequency divider is synchronized with the bits of the data blocks so that the output signal from the frequency divider can be regarded as the synchronous signal indicative of the boundary between two consecutive data blocks.

BRIEF DESCRIPTION OF THE DRAWINGS

The object and features of the present invention will become more readily apparent from the following detailed description of the preferred embodiment taken in conjunction with the accompanying drawings in which.

The same or corresponding elements and parts are designated at like reference numerals throughout the drawings.

DETAILED DESCRIPTION OF THE INVENTION

Figure 1:
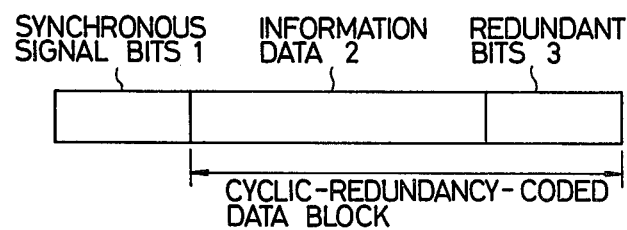
FIG. 1 is an explanatory diagram showing the conventional way of data block transmission.

Prior to describing the present invention, the conventional way of data block transmission will be discussed for a better understanding of the present invention. FIG. 1 illustrates a schematic diagram of a digital data block used in the conventional method of data transmission, using CRC (cyclic redundancy check) method. Only a single data block is shown for simplicity, where each data block is comprised of a synchronous signal bit word portion 1, an information data portion 2, and a redundant bit portion 3. The redundant bit portion 3 includes one or more bits added to the information data so that CRC will be effected to detect errors. The combination of the information data 2 and the redundant bits 3 is referred to as a cyclic-redundancy-coded data block. The synchronous signal bit word 1 comprises one or more bits which will be decoded to produce a synchronous signal used for distinguishing each data block from adjacent one. Namely, the synchronous signal bit word 1 is detected by the receiving end to produce the synchronous signal so that decoding of the information data will be executed in synchronism with the synchronous signal.

Figure 2:
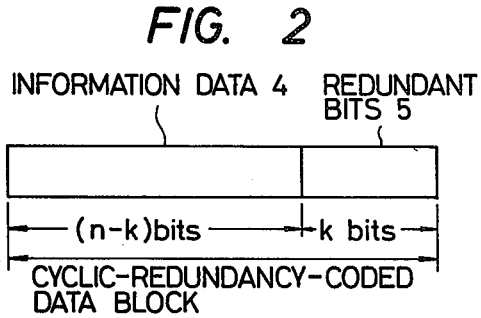
FIG. 2 is an explanatory diagram showing the way of data block transmission according to the present invention.

FIG. 2 illustrates a schematic data block form used in the data transmission method and system according to the present invention. As will be understood from the comparison of FIG. 1 and FIG. 2, the data block form of FIG. 2 differs from that of FIG. 1 in that no synchronous signal bit word is provided. Namely, each data block comprises an information data portion 4 and a redundant bit portion 5 having one or more redundant bits. In detail, the information data portion 4 includes data words having (n−k) bits wherein n and k are positive integers having a relationship of n>k, and the redundant bit portion 5 includes k bits so that each data block comprises n bits. The information data 4 may be produced, for instance, by converting an analog signal, such as an audio signal, into a digital signal, such as PCM signal.

The redundant bits 5 have been added for the purpose of CRC in the same manner as in the conventional method. Namely, the train of the redundant bits 5 equals the remainder of the division of the information data 4 by a predetermined generating polynominal. Suppose the digital signal of FIG. 2 is transmitted to a receiver, the boundary between adjacent data blocks cannot be ascertained in the absence of a synchronous signal with the conventional transmission system.

The present invention has been achieved, however, on the basis that the data block, i.e. the cyclic-redundancy-coded data block including the information data 4 and the redundant bits 5, is divisible by the generating polynominal without remainder if each data block comprises a predetermined number of bits because the number of bits forming each data block as well as the generating polynominal is usually known. With the provision of the synchronous signal generating circuit, which will be described later in detail, a synchronous signal indicative of the boundary between two consecutive data blocks will be produced by using the above-mentioned fact.

Figure 3:
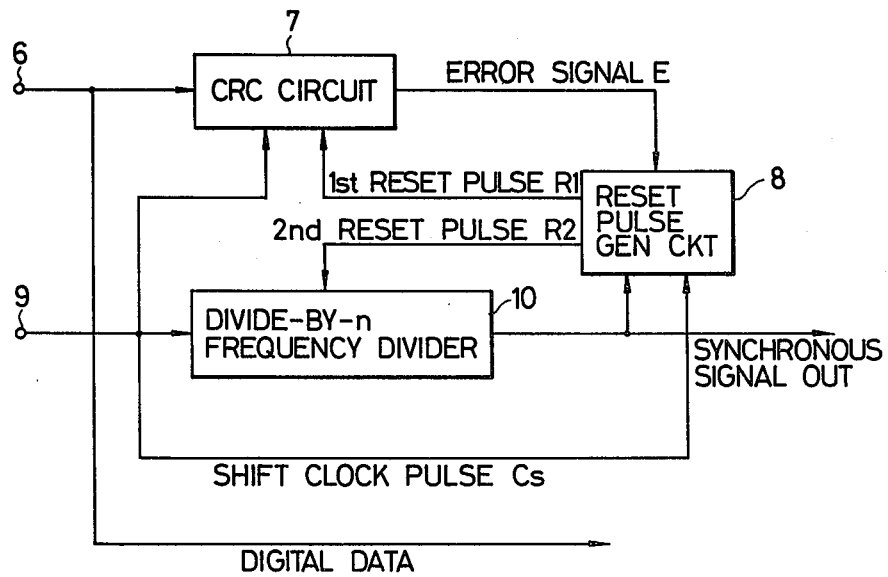
FIG. 3 is a schematic block diagram of a preferred embodiment of the system according to the present invention, which system is used for producing a synchronous signal from the transmitted data of FIG. 2.

Reference is now made to FIG. 3 which shows a schematic block diagram of the synchronous signal generating circuit according to the present invention. An input terminal 6 is provided to receive an incoming digital signal having a plurality of data blocks where each of the data blocks is assumed to have the form shown in FIG. 2. The input terminal 6 is connected to an input of a CRC circuit 7 in which it is detected whether the cyclic-redundancy-coded data block is divisible by a known generating polynominal without remainder. Namely, the CRC circuit 7 produces an output error signal E when a remainder is detected on division. Another input terminal 9 is provided to receive shift clock pulses Cs generated in an unshown clock pulse generator. The shift clock pulse train Cs has a frequency which is equal to the frequency of the bits of the data block fed to the input terminal 6. The shift clock pulse train Cs is fed to a divide-by-n frequency divider 10 so that the frequency divider 10 produces an output pulse train OUT having a frequency which is one-"n"th of the frequency of the input shift clock pulses Cs. In the above "n" is a positive integer which is equal to an integral multiple of the number of bits included in a single data block of FIG. 2.

The above-mentioned error signal E from the CRC circuit 7, the output pulses OUT from the frequency divider 10, and the shift clock pulses Cs from the input terminal 9 are all fed to a reset pulse generating circuit 8. The reset pulse generating circuit 8 produces first and second reset pulses R1 and R2 in accordance with these input signals. The first and second reset pulses R1 and R2 are produced basically at an interval of one data block. In addition further first and second reset pulses R1' and R2' are also produced in response to the error signal E. The first and second reset pulses R1 and R2 and the further first and second reset pulses R1' and R2', if any, are respectively fed to the CRC circuit 7 and to the divide-by-n frequency divider 10 to reset an unshown flip-flop in the CRC circuit 7 and a counter functioning as the frequency divider 10 to zero.

As the structure of the CRC circuit 7 and the frequency divider 10 is well known, description thereof is omitted for simplicity. The structure of the reset pulse generating circuit 8 will be described with reference to FIG. 4.

Figure 4:
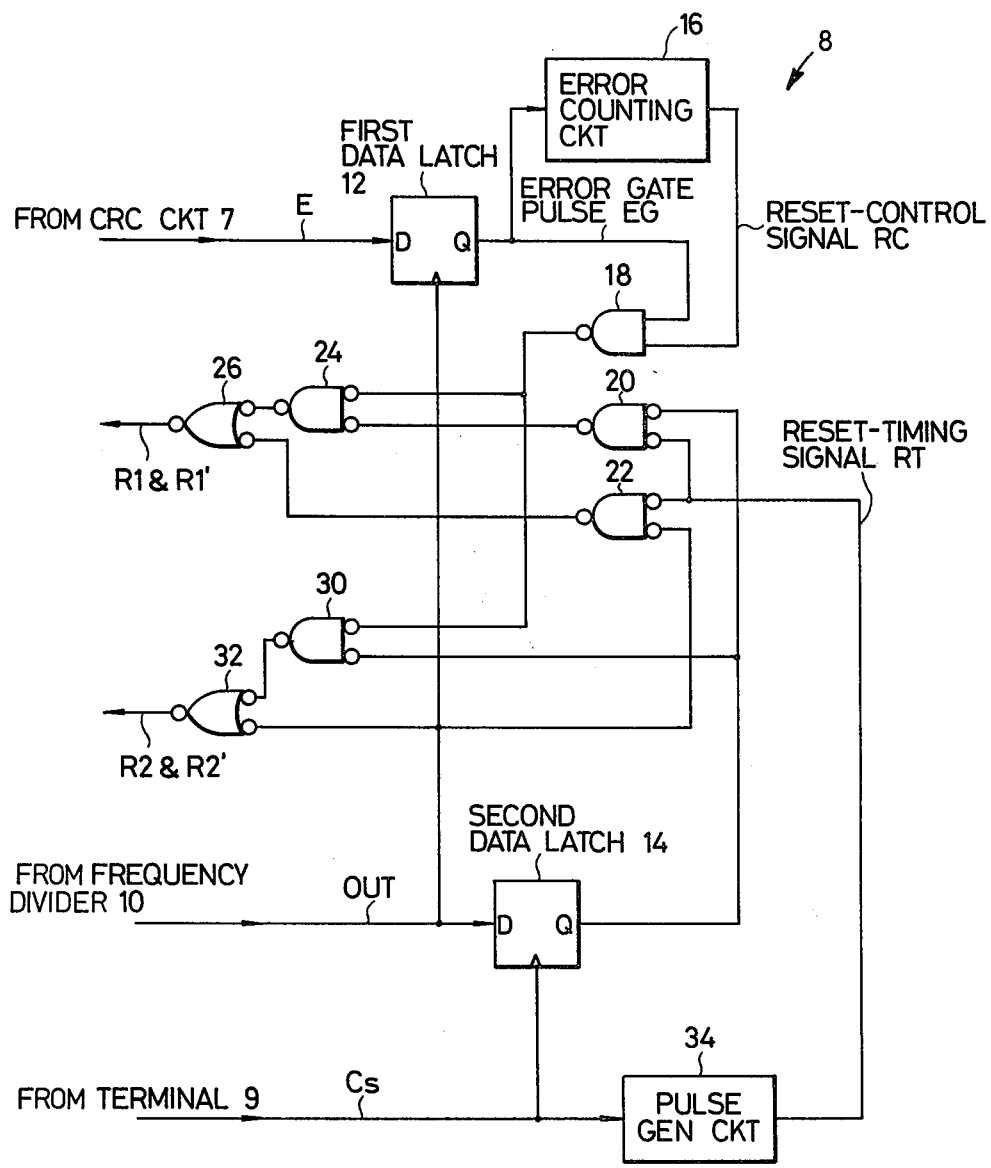
FIG. 4 is a detailed wiring diagram of the reset signal generating circuit shown in FIG. 3.

The reset pulse generating circuit 8 comprises, as shown in FIG. 4, two data latches 12 and 14, an error counting circuit 16, seven gates 18, 20, 22, 24, 26, 28, 30 and 32, and a pulse generating circuit 34. The error counting circuit 16 comprises a counter arranged to produce an output reset-control signal RC when the number of pulses fed from the first latch 12 reaches a predetermined number. The pulse generating circuit 34 is a pulse-width changing circuit for producing a pulse train signal synchronous with the shift clock pulses Cs.

The first data latch 12 is responsive to the error signal E from the CRC circuit 7 of FIG. 3 where latch timing is controlled by the output signal OUT from the frequency divider 10. The output signal from the first data latch 12 is fed to the error counter 16 whose output is connected to an input of a NAND gate 18 having another input responsive to the output signal from the first data latch 12. The output signal OUT from the frequency divider 10 is also fed to the second latch 14, an input of an INVERT-NAND or OR gate 22, and to an input of an INVERT-NOR or AND gate 32. The shift clock pulse Cs is fed to the pulse generating circuit 34 which generates a reset-control signal RC so that the reset control signal RC is fed to the other input of the OR gate 22 and to an input of an INVERT-NAND or OR gate 20. The shift clock pulse Cs is also fed to the second data latch 14 as a latch timing signal. The output signal from the second data latch 14 is fed to the other input of the OR gate 20 and to an input of an INVERT-NAND or OR gate 30. The output signal from the NAND gate 18 is fed to the other input of the OR gate 30 and to an input of an INVERT-NAND or OR gate 24 having an input responsive to the output signal from the OR gate 20. The output signal from the OR gate 22 is fed to an input of an INVERT-NOR or AND gate 26 which is also responsive to the output signal from the OR gate 24. The output signal from the AND gate 26 is fed to the CRC circuit 7 as the above-mentioned first reset pulse signal R1 and the further first reset pulse signal R1'. The output signal from the OR gate 30 is fed to the AND gate 32, the output of which is connected to the frequency divider 10, to send the above-mentioned second reset pulse signal R2 and the further second reset pulse signal R2'.

Figure 5:
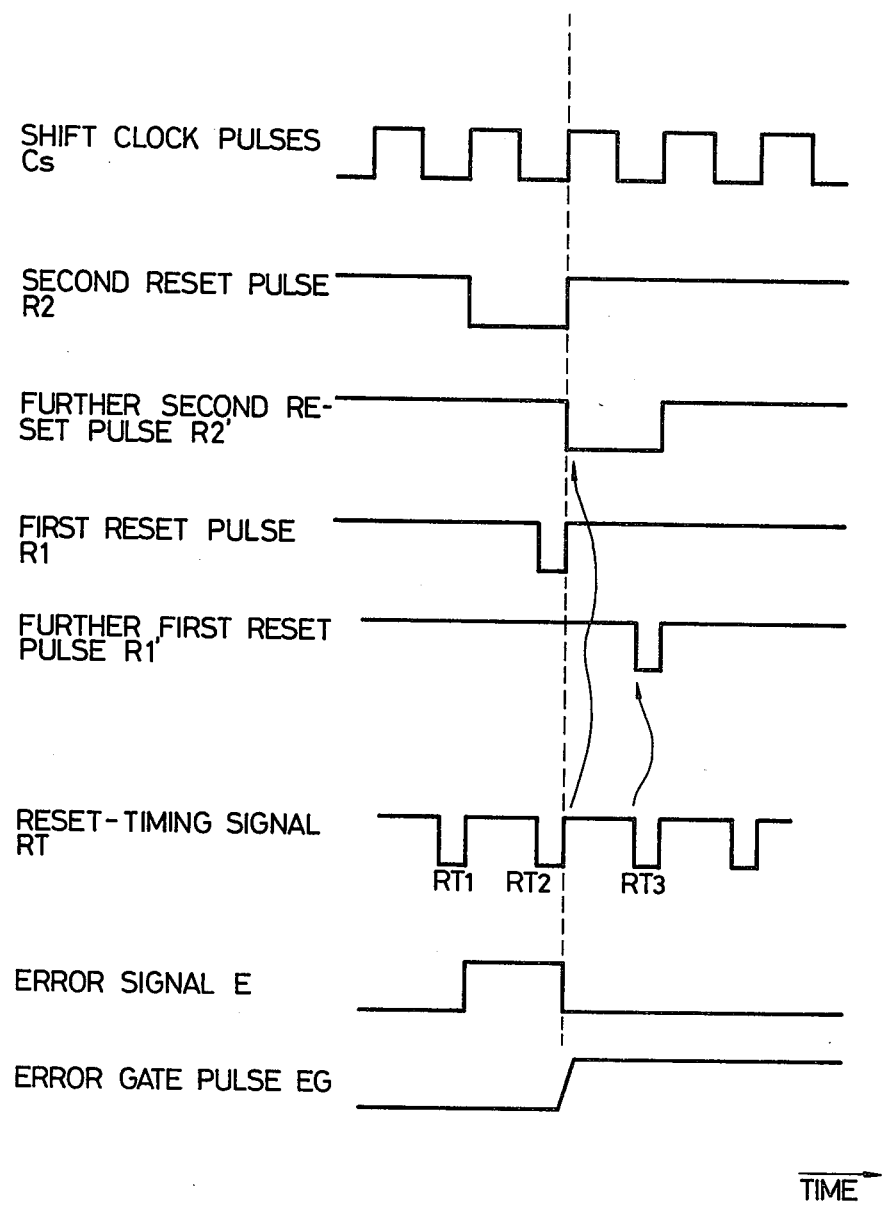
FIG. 5 is a timing chart useful for understanding the operation of the reset signal generating circuit of FIG. 4.

FIG. 5 is a timing chart showing various signals in the reset pulse generating circuit of FIG. 4. The shift clock pulse train Cs is shown as a regular interval pulse train. The output pulse train signal from the pulse generating circuit 34 is shown as a pulse train synchronous with the shift clock pulse signal, and as having a negative-going pulse width which is smaller than the width of the shift clock pulse. It is assumed that a positive-going error signal E is fed from the CRC circuit 7 to the first data latch 12. Since the error signal E is latched at the timing of the output pulse OUT from the frequency divider 10, the output signal of the first data latch 12, which will be referred to as an error gate signal EG, assumes low level in response to the trailing edge of the error signal E. In FIG. 5, the error gate signal EG changes from low level to high level on an assumption that the error gate signal EG has been assuming low level prior to receiving the error signal E. In the absence of the error signal E, the error gate signal EG assumes low level. The above-mentioned seven gate circuits 18 through 32 process the error gate signal EG from the first data latch 12, the reset-control signal RC from the error counting circuit 16, the output signal from the pulse generating circuit 34, the output signal from the second data latch 14, and the output signal OUT from the frequency divider 10 to produce the above-mentioned first and second reset pulses R1 and R2 and the further first and second reset pulses R1' and R2'. As will be described later, each of the first and second reset pulses R1 and R2 is periodically produced irrespective of the presence of the error signal E. The further second reset pulse R2' is synchronous with a trailing edge of one negative-going reset-timing pulse $RT_2$, while the further first reset pulse R1' is synchronous with a leading edge of a following negative-going reset timing pulse $RT_3$.

Assuming that a plurality of the error signals E are fed to the error counting circuit 16 so that the reset-control signal RC is produced, in the presence of both the error gate signal EG and the reset-control signal RC the NAND gate 18 produces an output which enables the OR gates 24 and 30. Therefore, the AND gates 26 and 32 respectively produces further first and second reset pulses R1' and R2' as shown in FIG. 5.

Figure 6:
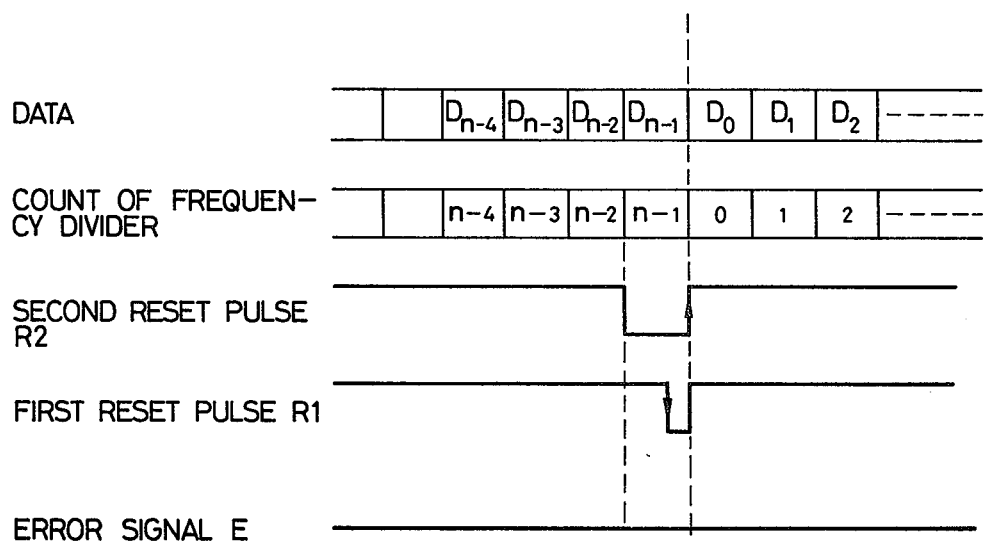
FIGS. 6 to 8 are timing charts useful for understanding the operation of the system of FIG. 3.
Figure 7:
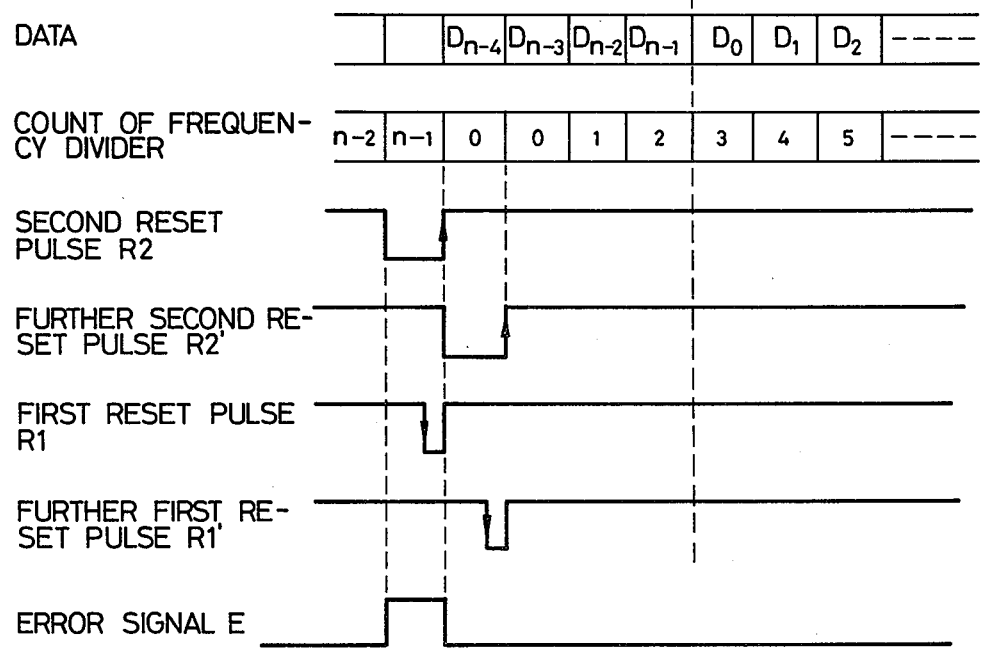
Figure 8:
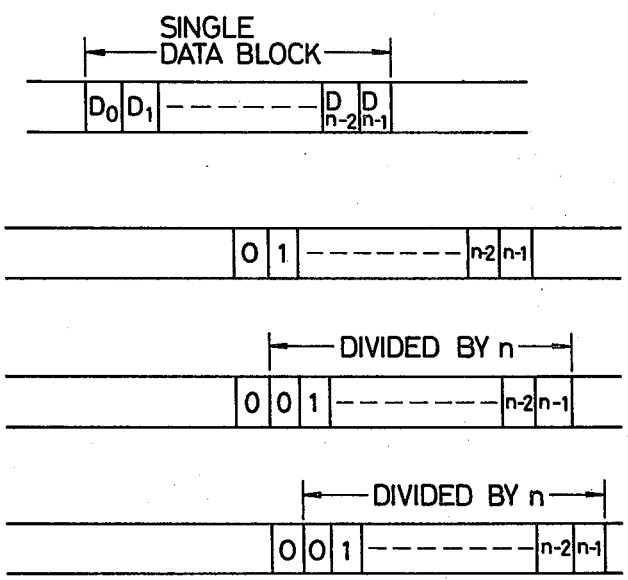

The operation of the circuitry of FIG. 3 will be described with reference to timing charts of FIGS. 6 through 8. The bits of the information data 4 of FIG. 2 are designated at the references $D_0, D_1, D_2 \ldots D_{n-2}$ and $D_{n-1}$ as shown in FIGS. 6 through 8, while the state or counted value of the frequency divider 10 is expressed in terms of $0, 1, 2 \ldots n-2$ and $n-1$. The bit $D_0$ is the first bit of the CRC data block, i.e. the first bit of the information data 4, and the bit $D_{n-1}$ is the last bit of the CRC data block, i.e the last bit of the redundant bits 3. Assuming that the counted value of the frequency divider 10 is 0 at the time of the first bit $D_0$, the first and second reset pulses R1 and R2 are generated by the reset pulse generating circuit 8 at the time that the counted value of the frequency divider 10 is $n-1$. Namely, the first and second reset pulses R1 and R2 are generated at the time of the last bit $D_{n-1}$. Since the output signal OUT from the frequency divider 10 is produced when the count is $n-1$, the output pulse OUT having such timing can be regarded as a synchronous signal representing the timing of the last bit of the data block. Under this condition, none of the above-mentioned further first and second reset pulses R1' and R2' is generated. Therefore, a subsequent data block will be checked to see if there is an error.

Let us assume that the frequency divider 10 is asynchronous with the bits of the data block so that the relationship therebetween is as shown in FIG. 7. The first and second reset pulses R1 and R2 are respectively generated at the time that the count of the frequency divider 10 assumes $n-1$. At this time, the CRC circuit 7 produces the error signal E which will be fed to the data latch 12. Suppose that the error counting circuit 16 is arranged to produce its output signal when receiving two error gate pulses EG from the data latch 12 within a predetermined period of time, and suppose that an error gate pulse EG has already been sent from the first data latch 12 to the error counting circuit 16, the error counting circuit 16 produces an output signal in the presence of a subsequent error gate pulse EG which is produced in response to the error signal E of FIG. 7. As a result, the AND gate 18 is enabled to cause the following gate circuits to produce the aforementioned further first and second reset pulses R1' and R2'. Both the CRC circuit 7 and the frequency divider 10 are initialized again by the further first and second reset pulses R1' and R2'. Therefore, the flip-flop included in the CRC circuit 7 is reset to either 0 or 1, while the count of the frequency divider 10 is reset to zero so that the count of the frequency divider 10 shows zero again as shown in FIG. 7.

The above operation is repeated so that the counter of the frequency divider 10 starts counting the number of shift clock pulses Cs from an instant which is retarded by one pulse width of the shift clock pulses Cs for each of the data blocks continuously fed to the CRC circuit 7. Accordingly, the count in the frequency divider 10 is shifted one by one with respect to the bits of the data block as shown in FIG. 8. The above operation of shifting with the further first and second reset pulses R1' and R2' is repeated until the count of the frequency divider 10 becomes synchronous with the bits of the data block as shown in FIG. 6. When synchronism is established, namely, when the phase of the data block accords with the count of the frequency divider 10, no error signal E is produced and therefore, no further first and second reset pulses R1' and R2' is produced from the reset pulse generating circuit 8. Accordingly, once synchronism is established, the relationship between the data block and the count of the frequency divider 10 is held in the condition of FIG. 6 so that the ouptut signal of the frequency divider 10 is repeatedly produced indicating the boundary between two consecutive data blocks. In other words, the output signal of the frequency divider 10 can be regarded as a synchronous signal indicating the timing of each data block.

The produced synchronous signal OUT from the divide-by-n frequency divider may be used in the same manner as the conventional synchronous signal which have been derived from the synchronous signal bit word transmitted with the data blocks. Namely, the input digital data at the input terminal 6 will be decoded with the timing of the synchronous signal OUT from the frequency divider 10 in a conventional decoding system. From the foregoing it will be understood that the present invention provides a new system for producing a synchronous signal so that digital data transmitted without synchronous signal bit words can also be accurately decoded. Since no data of synchronous signal is needed to be transmitted together with information data, transmission rate can be remarkably increased compared to the conventional method of transmission.

The above-described embodiment is just an example of the present invention, and therefore, it will be apparent for those skilled in the art that many modifications and variations may be made without departing from the spirit of the present invention.

What is claimed is:

1. A system for producing a synchronous signal from cyclic-redundancy-coded digital data blocks, comprising:

(a) a cyclic redundancy check circuit responsive to said digital data blocks and to shift clock pulses used for shifting bits of said data blocks, for producing an output error signal indicative of the presence of remainder of division of one of said digital data blocks by a predetermined generating polynominal, where said division is effected within said cyclic redundancy check circuit;

(b) a frequency divider for producing an output signal by dividing the frequency of said shift clock pulses; and (c) a reset pulse generating circuit responsive to the output signal from said frequency divider and to said shift clock pulses for producing first and second reset pulses in the presence of said output signal from said frequency divider and one of said shift clock pulses, said first and second reset pulses being respectively fed to said cyclic redundancy check circuit and to said frequency divider as initializing signals, said reset pulse generating circuit being further responsive to said error signal for producing, in the presence of said error signal and one of said shift clock pulses, further first and second reset pulses with which said cyclic redundancy check circuit and said frequency divider are initialized again so that initialization is repeatedly effected until said frequency divider is synchronous with the bits of said data blocks where the output signal from said frequency divider can be regarded as said synchronous signal indicative of the boundary between two consecutive data blocks, said reset pulse generating circuit being arranged to produce said first and second reset pulses.

2. A system as claimed in claim 1, wherein said reset pulse generating circuit comprises:

(a) a first data latch for temporarily storing said error signal in response to the output signal from said frequency divider;

(b) an error counting circuit for producing an output signal when the number of the output signals from said first data latch reaches a predetemined number within a predetermined period of time;

(c) a NAND gate responsive to the output signals from said first data latch and said error counting circuit for producing an output signal;

(d) a pulse generating circuit responsive to said shift clock pulses for producing a reset-timing signal which is synchronous with said shift clock pulses;

(e) a second data latch for temporarily storing said output signal from said frequency divider in response to said shift clock pulses;

(f) a first OR gate responsive to the output signal from said second data latch and to said reset-timing signal for producing an output signal;

(g) a second OR gate responsive to the output signal from said frequency divider and to said reset-timing signal for producing an output signal;

(h) a third OR gate responsive to the output signal from said NAND gate and to the output signal from said first OR gate for producing an output signal;

(i) a fourth OR gate responsive to the output signal from said NAND gate and to the output signal from said second data latch;

(j) a first AND gate responsive to the output signal from said third OR gate and to the output signal from said second OR gate for producing said first reset pulse as well as said further first reset pulse; and (k) a second AND gate responsive to the output signal from said fourth OR gate and to the output signal from said frequency divider for producing said second reset pulse as well as said further second reset pulse.

3. A method of producing a synchronous signal from cyclic-redundancy-coded digital data blocks, comprising the steps of:

(a) producing an error signal indicative of the presence of remainder of division of one of said digital data blocks by a predetermined generating polynominal by effecting cyclic redundancy check in response to shift clock pulses used for shifting bits of said data blocks, said error signal being produced by a cyclic redundancy check circuit in which said division is performed;

(b) producing an output signal by dividing the frequency of said shift clock pulses by means of a frequency divider;

(c) producing first and second reset pulses in the presence of the output signal from said frequency divider and to one of said shift clock pulses;

(d) producing further first and second reset pulses in the presence of said error signal and one of said shift clock pulses;

(e) initializing said cyclic redundancy check circuit and said frequency divider by said first and second reset pulses and by said further first and second reset pulses; and (f) repeating the step of initializing until said frequency divider is synchronized with the bits of said data blocks so that the output signal from said frequency divider can be regarded as said synchronous signal indicative of the boundary between two consecutive data blocks.

* * * * *